US005735531A

United States Patent [19]

Jordan

[11] Patent Number: 5,735,531

[45] Date of Patent: Apr. 7, 1998

[54] SEALING ARRANGEMENT

[75] Inventor: Holger Jordan, Leinfelden-Echterdingen, Germany

[73] Assignee: Busak & Shamban GmbH & Co., Germany

[21] Appl. No.: 571,872

[22] PCT Filed: Jul. 8, 1994

[86] PCT No.: PCT/DE94/00789

§ 371 Date: Sep. 10, 1996

§ 102(e) Date: Sep. 10, 1996

[87] PCT Pub. No.: WO95/02776

PCT Pub. Date: Jan. 26, 1995

[30] Foreign Application Priority Data

Jul. 12, 1993 [DE] Germany .......................... 43 23 266.3

[51] Int. Cl.[6] .......................... F16J 15/16

[52] U.S. Cl. .......................... 277/500

[58] Field of Search .......................... 277/174, 177, 277/206 R, 208, 165

[56] References Cited

U.S. PATENT DOCUMENTS

| | | | |
|---|---|---|---|
| 2,888,281 | 5/1959 | Ratti . | |
| 2,974,646 | 3/1961 | Miller et al. | 277/174 |
| 3,228,705 | 1/1966 | Underwood | 277/206 R |
| 3,312,149 | 4/1967 | Fleckenstein et al. | 277/206 R |
| 3,768,819 | 10/1973 | Burkert | 277/206 R |
| 3,942,805 | 3/1976 | Sundqvist | 277/177 |
| 4,201,393 | 5/1980 | Kawashima et al. | 277/206 R |
| 4,890,849 | 1/1990 | Eason | 277/177 |
| 5,002,290 | 3/1991 | Pernin | 277/206 R |
| 5,277,327 | 1/1994 | Nakano et al. | 277/206 R |
| 5,429,374 | 7/1995 | Eichenberger | 277/174 |

FOREIGN PATENT DOCUMENTS

| | | | |
|---|---|---|---|
| 2606850 | 11/1986 | France . | |
| 1871830 | 2/1963 | Germany . | |
| 1475603 | 8/1965 | Germany . | |
| 2104859 | 2/1971 | Germany . | |
| 3327624 | 7/1983 | Germany . | |
| 3703360 | 2/1987 | Germany . | |
| 4038619 | 12/1990 | Germany . | |
| 0679481 | 9/1952 | United Kingdom | 277/206 R |
| 1142857 | 2/1969 | United Kingdom | 277/206 R |

*Primary Examiner*—William A. Cuchlinski, Jr.
*Assistant Examiner*—John L. Beres
*Attorney, Agent, or Firm*—Walter A. Hackler

[57] ABSTRACT

A configuration for sealing a gap 38 between two mutually concentric machine parts 31, 36 which move relative to each other exhibits a sealing ring 10 in the groove 32 which is mounted in spatially fixed fashion in machine element 31. The machine element 36 moves relative to the machine element 31. The sealing ring 10 in accordance with the invention is flexible in response to radial and axial forces acting on the sealing ring. The pressure dependent deformation of the sealing ring 10 is reversible, i.e. the sealing ring 10 automatically returns to its original shape for decreased fluid pressure on the high pressure side H.

6 Claims, 3 Drawing Sheets

SEALING ARRANGEMENT

BACKGROUND OF THE INVENTION

The invention concerns an arrangement for sealing a gap between two mutually concentric machine parts which move relatively to each other, a first machine part having a groove and a second machine part having a smooth seating surface facing the groove, whereby a sealing ring made from a rubber elastic material can be placed into the groove, and the sealing ring can be deflected towards a radially directed surface of the groove under the application of fluid pressure, whereby, when the pressure is reduced, the pressure dependent deflection of the sealing ring is automatically reduced towards the original position of the sealing ring in the pressureless state, whereby the sealing ring exhibits spreadable shoulders facing the bottom of the groove which form a region of static sealing and a closed ring shaped volume which is defined by the groove bottom, whereby the sealing ring is prebiased via lines of intersection of the shoulders seated on the bottom of the groove and a sealing ring surface forms a region of dynamic sealing which can be pressure relieved in proportion to the applied fluid pressure, whereby the cross section of the sealing ring has a pressure resistant body geometry in the vicinity of the dynamic seal and a body geometry in the vicinity of the static seal which can be substantially changed by pressure.

An arrangement of this type for sealing a gap is known in the art through DE-OS 14 75 603.

The conventional seal seats in its installed state with one sealing surface on a seating surface of the one machine part and with spreadable legs on the groove bottom of a second machine part. The sealing ring exhibits a certain prebias in the installed state. The cross sectional geometry of the sealing ring is configured in such a manner that both the low pressure and the high pressure sides of the sealing ring are parallel to the sides of the groove. When fluid pressure is applied, the sealing ring is deflected towards the low pressure side of the groove and seats over an area of the groove side. When additional fluid pressure is applied, the sealing ring is deformed in such a manner as to seat over an area of the low pressure side of the groove and on the groove bottom. The conventional sealing ring reacts to the application of fluid pressure with increasing material deformation. As a result, the life-time of the sealing ring is reduced as is the operating time of the sealing arrangement.

In the conventional sealing arrangement of DE-OS 21 04 859 a sealing ring seats in the installed state with a certain prebias with a sealing edge on a seating surface of the one machine part at the bottom of a ring-shaped groove of the other machine part. The cross sectional form of the conventional sealing ring has a section facing the bottom of the groove and a section facing the sealing surface which are connected to each other via a flexible middle strut. Both sections of the cross sectional form of the sealing ring are made from solid bodies. For this reason the prebiasing of the sealing ring cannot be reduced via the section seating on the bottom of the groove, i.e. in the vicinity of a static seal. Increased application of pressure therefore leads to an increase in the radial pressure component on the sealing edge so that the pressure load of the conventional sealing ring at the sealing edge increases in proportion to the applied pressure. For this reason the application of high pressures to the conventional sealing ring is not possible.

A sealing arrangement for two machine components which move relative to each other and have a deflectable sealing ring has become known in the art through DE GM 18 71 830. This conventional sealing ring is pushed onto the low pressure side of the groove under the application of pressure. Due to the cross sectional shape of the sealing ring, which is a solid body having concave shaped side surfaces, the sealing ring is pressed into the groove under the application of pressure. The pressing of the sealing ring leads to an increase in the radial component of the force and to a strengthened load on the sealing edge.

An arrangement for sealing a gap has become known in the art through DE OS 40 38 619. This known sealing arrangement has a cross sectional shape of a disc which is tilted into a diagonal working position in which the sealing element is wedged and held. The conventional sealing element is dimensioned in such a fashion that it is separated from the bottom of the groove of the one machine element as well as from the outside surface of the other machine element when inserted between the machine parts. The sealing element sections first come to seat on the groove bottom and on the outside surface when the conventional sealing element is pivoted to seal a gap between the machine elements. The conventional sealing element has a solid form and is thereby compressed in the outer region and stretched in the inner region.

It is the purpose of the present invention to further improve the conventional sealing element in such a fashion that the frictional forces and the extrusion behaviour in the vicinity of the dynamic seal is improved.

SUMMARY OF THE INVENTION

This purpose is achieved in accordance with the invention in that the sealing ring has a cross section having recesses which open towards the high pressure H and low pressure N sides and which radially define the shoulders in such a fashion that the sealing ring pivots towards the low pressure side N under the application of fluid pressure in the vicinity of the dynamic seal to reduce the size of a free volume defined by the spreadable shoulders, the sealing ring area produced by the low pressure sided recess, and the low pressure side of the groove.

The sealing ring in accordance with the invention thereby has the essential advantage that it exhibits substantially improved flexibility compared to the conventional sealing elements under axial and radial loading.

Dimensional interference is to be understood here as the overdimensioning of a sealing ring relative to the installation region. That is to say, if a sealing ring is overdimensioned it can only be inserted into an installation region when material is compressed. When such a sealing ring is mounted it experiences a certain self-biasing within the installation region.

The sealing ring in accordance with the invention has a body geometry which allows for the overdimensioning relative to the groove in the vicinity of the static seal to be compensated for by means of spreadable shoulders which seat on the bottom of the groove. This measure guarantees that the frictional values in the dynamic sealing region can be kept small, i.e. the sealing ring is not stretched at the dynamic sealing surface. Therefore material fatigue can be eliminated in this region. For this reason large interferences can be accommodated with the sealing ring configuration in accordance with the invention without having a large amount of friction in the vicinity of the dynamic sealing edge when the pressure is low. The radial prebiasing of the sealing ring in accordance with the invention is thereby flexibly adjustable by means of the changeable shape resistance of the sealing ring in the vicinity of the static seal. It is furthermore possible to compensate for tolerances with the sealing ring in accordance with the invention over a wide range without a deterioration in the sealing function. In the event that the sealing ring in accordance with the invention is subjected to pressure, it seats more or less firmly on a fixed surface in the groove by deforming itself in such a fashion that a pressure maximum is established in the vicinity of the dynamic seal which increases with increasing pressure and the sealing ring in accordance with the invention seats to an ever increasing extent only with linear contact on the seating surface of the second machine element. The sealing ring in accordance with the invention can flexibly give way under pressure towards the low pressure side by pivoting out of the original position and, when the pressure falls, pivot back into its original position. That is to say, a load relief of the dynamic sealing surface or sealing edge with increasing pressure is possible and the dynamic contact point can be lubricated in an improved fashion since the medium under pressure can freely penetrate up to the sealing edge.

In a preferred improvement the groove opens towards the high pressure side H to form a profiled section.

This has the advantage that the sealing ring in accordance with the invention can be used for both the simplest groove shapes in sealing technology as well as in a wide range of applications in general sealing technology.

The sealing ring has a cross section having a body geometry which is resistant to pressure in the vicinity of the dynamic seal and which can be greatly changed by pressure in the vicinity of the static seal.

This has the advantage that the sealing ring contours in accordance with the invention are largely stable and pressure independent in the vicinity of the dynamic sealing edge. The sealing ring in accordance with the invention lends itself to good theoretical design based on certain initial specifications and these design values can actually be reliably obtained in practice.

In a further configuration of the invention, the body geometries which are changeable under pressure are formed from sealing ring sections which are directed relative to each other in such a fashion as to define an angle which changes under pressure.

This has the advantage that the sealing ring sections function like "hinges" which open or close to a greater or lesser extent depending on the pressure. The use of rubber elastic material, for example, poylurethane, or a mixture of different rubber elastic materials, which can also be arranged in partial regions of the sealing ring in pure form, allows the sealing ring in accordance with the invention to adjust its sealing action to the pressure.

In a further improved embodiment, the sealing ring forms a wedge shaped gap with the sealing surface and the seating surface of a second machine part under the application of fluid pressure which opens in the direction towards the high pressure side H and whose size is pressure dependent.

This has the advantage that the sealing ring in accordance with the invention can be pressure relieved, i.e. the higher the fluid pressure loading the sealing ring, the higher the relief on the sealing edge. In this manner the frictional values between the sealing ring and the seating surface can be kept small.

In a preferred embodiment the sealing ring is formed, in cross section, from the sealing ring surface which faces the seating surface, from first and second conical surfaces bordering the sealing ring surface which spread obliquely apart, from third and fourth conical surfaces which run towards another obliquely and border the first and second conical surfaces, and from first and second shoulders which spread obliquely apart and are adjacent thereto, the third and fourth conical surfaces defining the recesses with the shoulders, whereby the shoulders are connected to each other facing the bottom of the groove via an angle and form an angle with the third and fourth conical surfaces ($\beta_1$, $\beta_2$, $\beta_3$, $\beta_4$, $\beta_5$).

This concrete geometric configuration of the sealing ring in accordance with the invention has the advantage that the sealing ring is simple to manufacture and that lines of intersection are formed from the mutually adjacent conical surfaces which, during operation, can assume the function of a sealing edge, a center of gravity, a distance holder, a hinge, and the like.

In further preferred configurations of the invention, the sealing ring is constructed symmetrically. This has the advantage that the sealing ring in accordance with the invention can be mounted in a simplified fashion without having to pay attention to a particular installation position.

In a further possible configuration of the invention the shoulders are formed on the high pressure side H and the low pressure side N with different lengths and/or widths.

This has the advantage that the sealing ring in accordance with the invention can be easily adjusted to special sealing applications via the dimensioning of the shoulders and the most widely differing sealing problems can thereby be solved in as simple a fashion as possible. The advantageous symmetric configuration of the sealing rings is sacrificed in order to be able to solve specific application problems.

In other configurations of the invention the sealing ring exhibits conical surfaces directed in each case towards the low pressure side of the groove which are connected to enclose an angle. This has the advantage that the sealing ring in accordance with the invention is also highly flexible in the axial direction and can assume the most differing working positions within the groove volume in a pressure dependent fashion. These changed working positions are adjusted continuously depending on the pressure.

A particular application of the sealing ring in accordance of the invention is for rotational feed-throughs in hydraulics, in particular for excavation devices and similar machines.

The sealing ring in accordance with the invention therefore satisfies all extended requirements which are posed in the area of hydraulics. The sealing ring has a full shape in the vicinity of the dynamic sealing edge and a jagged profile in the vicinity of the static sealing edge or sealing edges. A preferred profile is one in which there are rows of conical surfaces on the radially directed sides of the sealing ring. In the event that the sealing ring in accordance with the invention is symmetrically constructed the direction of installation is arbitrary. In the event that the sealing ring in accordance with the invention exhibits two shoulders (sealing lips) the interference obtaining in the pressureless operation state is compensated for in the static sealing region. This allows for the realization of larger interferences without having high frictional force at low pressures. A separation of the sealing profile from the sides of the groove supports the flexibility of the sealing shape. When pressure is applied the sealing ring in accordance with the invention pivots within the installation region to advantageously influence the load on the dynamic sealing edge through well-defined biasing of the sealing profile, and a local pressure maximum is formed. The pivoting process adjusts the pressure distribution in the vicinity of the dynamic sealing surface in such a fashion that a lubricating film can be formed in front of the actual sealing edge. A large radial seating surface on the low pressure side of the groove and the additional pressing due to the pivoting process provide for a high degree of security against twisting (positional fixing in the groove). It is possible to have low frictional moments with the sealing ring in accordance with the invention, the sealing ring can be loaded at high pressures, is wear resistant with low extrusion and is robust during installation. An aging of the rubber elastic material can be compensated for by means of the hinge-like shoulders in a static sealing region (PUR-compression set compensation). Finally, mention is made of the lack of sensitivity of the sealing behaviour to tolerances in the dimensions of the machine components or of the sealing ring in accordance with the invention.

The invention also includes sealing ring cross sectional shapes of a lipped sealing ring with lines of contact (for example a four-lipped sealing ring) or a double T-shape as far as these cross sections are configured in such a fashion that interferences between the sealing ring and the installation region can be relieved in the pressureless state in the vicinity of the static seal and the sealing ring in accordance with the invention can be reversibly deflected towards a low pressure sided support surface in a fluid pressure application state. The deflection can also be a rolling-off process and cross sectional forms which are per se known in the art can thereby make use of the invention by having, along the lengths and/or widths of cross sectional shape, materials, material sections, or material additives which are reversibly deformed to different degrees under the application of pressure and which thereby behave when installed or operated in a manner recited in the patent claims. The solid geometries which are influenced by pressure can also be produced by openings of arbitrary types and can replace the sections or areas bordering another at defined angles.

Further advantages can be derived from the description and the accompanying drawing. The previously and subsequently mentioned features can be utilized in accordance with the invention individually or collectively in arbitrary combination. The embodiments mentioned are not to be considered as exhaustive enumeration rather have exemplary character only. The invention is represented in the drawing and will be more closely explained with reference to the embodiments.

DESCRIPTION OF THE PREFERRED EMBODIMENT

Figure 1:
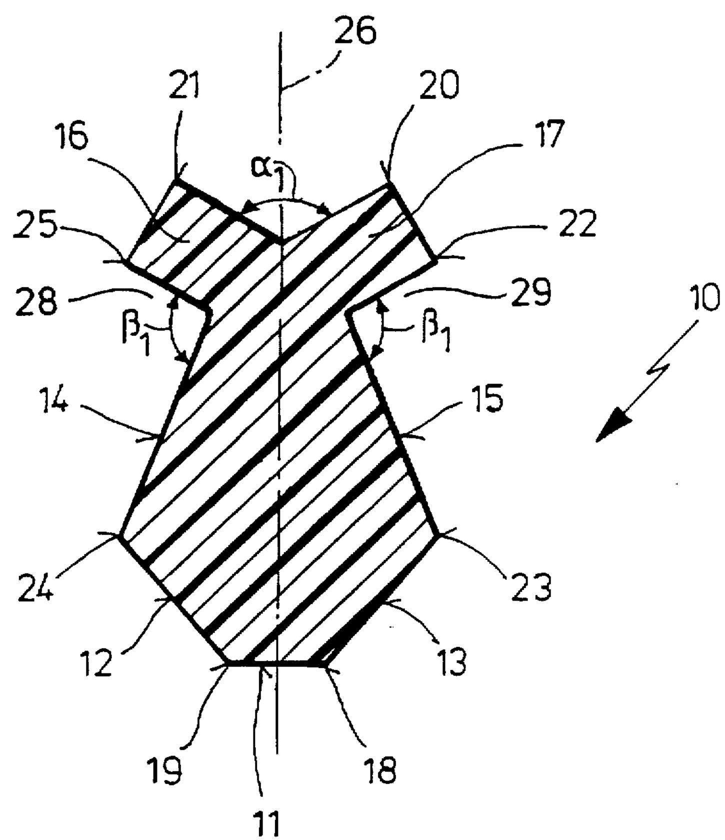
FIG. 1 shows a cross section of a sealing ring in accordance with the invention without the installation region for which this sealing ring is provided.

The individual figures of the drawing show the object of the invention in a partially highly schematic fashion and are not to be taken to scale. The objects of the individual figures and sections of the sealing ring in accordance with the invention are partially shown in a highly enlarged fashion and are exaggeratedly distorted so that the functional behaviour of the sealing ring in accordance with the invention can be shown more clearly.

FIG. 1 shows a sealing ring 10 made from a rubber elastic material which exhibits a sealing ring surface 11 to which a first conical surface 12 and a second conical surface 13 are adjacent.

The first and second conical surfaces 12, 13 spread apart obliquely and third and fourth conical surfaces 14, 15 run towards another and are adjacent to the conical surfaces 12, 13. Shoulders 16, 17 are adjacent to the third and fourth conical surfaces 14, 15 and are connected at an angle $\beta_1$ to the conical surfaces 14, 15. The shoulders 16, 17 are connected to each other at an angle $\alpha_1$.

The sealing ring surface 11 forms lines of intersection 18, 19 with the first and second conical surface 12, 13 which assume the function of sealing edges during operation. The conical surfaces 12, 13 form lines of intersection 23, 24 with the third and fourth conical surfaces 14 and 15 which can form seating lines at spatially fixed groove sides during operation.

The shoulders 16, 17 likewise exhibit lines of intersection 20, 21, 22, 25 which can assume the function of static sealing edges during operation. Sealing ring recesses 28, 29 are adjacent to the shoulders 16, 17 in the radial direction relative to sealing ring surface 11.

The sealing ring 10 shown in FIG. 1 is constructed symmetrically with respect to the symmetry axis 26.

Figure 2:
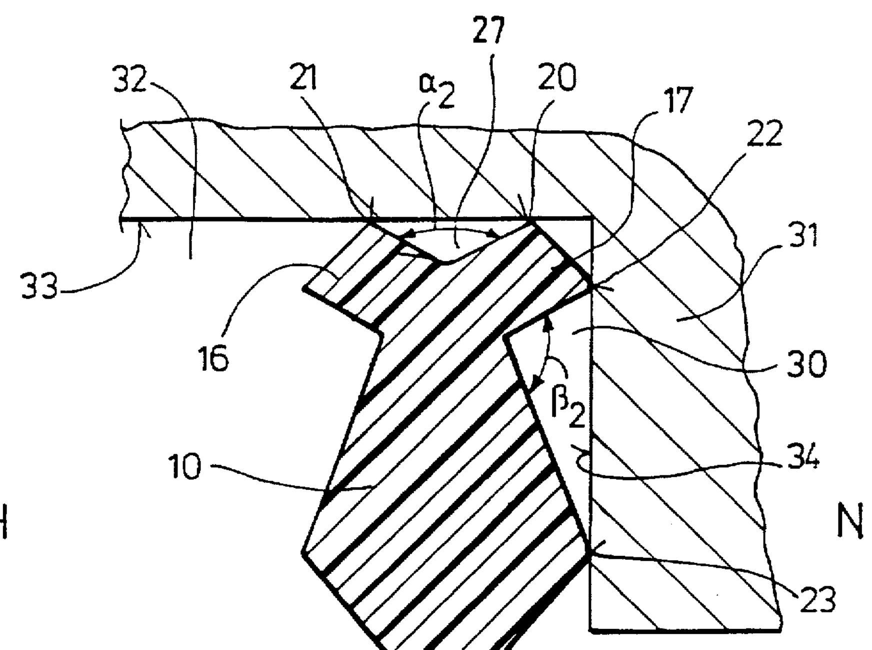
FIG. 2 shows a cross section of a sealing ring in accordance with the invention as installed in a groove region of a first machine part.

FIG. 2 shows the sealing ring 10 as it is installed in a first machine part 31 in a groove 32. The sealing ring 10 is overdimensioned relative to the groove 32. In the event that the sealing ring 10 is introduced into the groove 32 the shoulders 16, 17 must be spread apart so that interference in the static sealing region can be reduced. The sealing ring 10 is prebiased on the bottom of the groove 33 in the installation position shown in FIG. 2. The sealing ring 10 seats via the lines of intersection 20, 21 at the bottom of the groove 33 and the shoulders (16, 19) and the groove bottom (33) define a ring-shaped volume (27). The lines of intersection 20, 21 assume the function of static sealing edges. The sealing ring 10 seats on the low pressure side of the groove 34 via lines of intersection 22, 23.

When the sealing ring 10 is installed into the groove 32, the angle $\alpha_2$ is increased with respect to the angle $\alpha_1$ in FIG. 1. The angle $\beta_2$ has decreased relative to the angle $\beta_1$ of FIG. 1, whereby the spreadable shoulders 17, the sealing ring surface 15 and the low pressure groove side 34 form a free volume 30.

H indicates the high pressure side in FIG. 2 and N the low pressure side. The sealing ring has not yet been subjected to pressure in FIG. 2.

Figure 3:
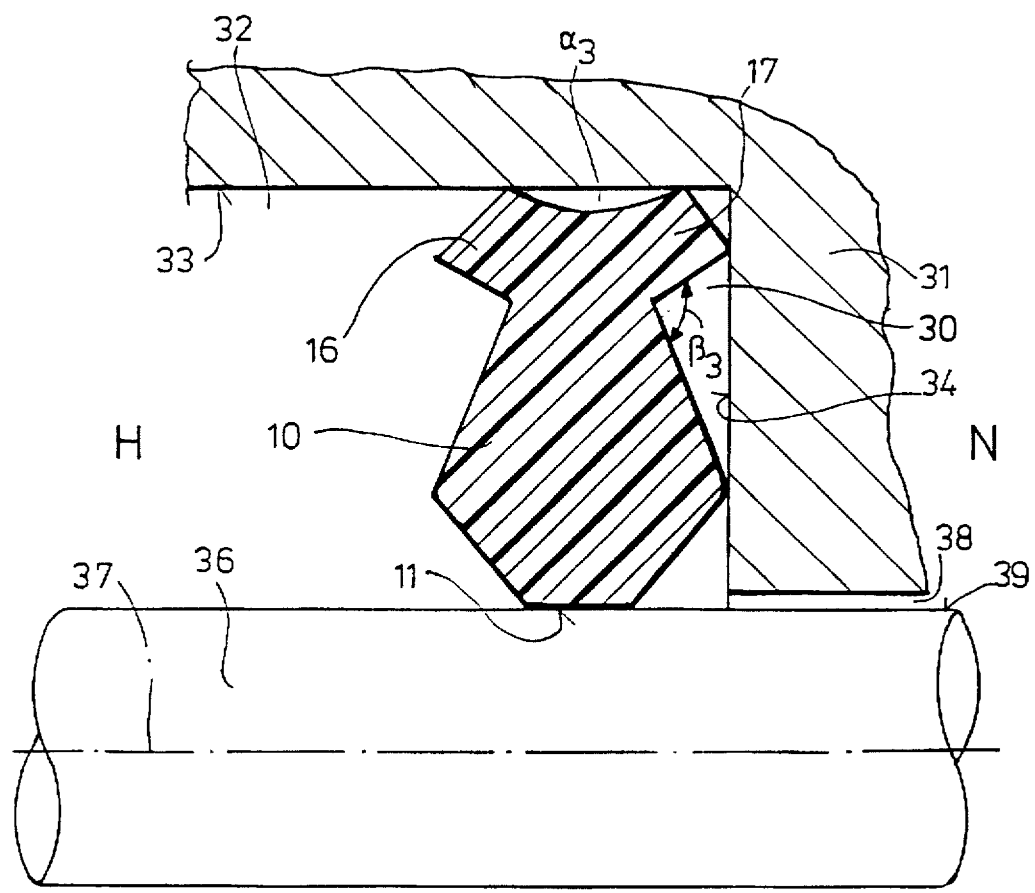
FIG. 3 shows a cross section of sealing ring in accordance with the invention as installed in a groove region of a first and second machine element.

FIG. 3 shows the sealing ring 10 in accordance with the invention in the installed position between the first machine element 31 and a second machine element 36. The machine elements 31, 36 are concentric relative to the axis 37. The sealing ring 10 seals a gap 38 between the machine elements 31, 36. The sealing ring 10 seats in the static sealing region with the shoulders 16, 17 on the groove bottom 33 and, in the dynamic sealing region, the sealing ring 10 seats with sealing ring surface 11 on a seating surface 39 of the second machine element 36. In the position shown in FIG. 3, the sealing ring 10 has not yet been subjected to pressure. Compared to FIG. 2 the angle $\alpha_3$ has increased further compared to the angle $\alpha_2$, i.e. an additional dimensional interference which is to be compensated for through the insertion of the machine element 36 is compensated for by an additional pivoting of the shoulders 16, 17 in the static sealing region. The angle $\beta_3$ has been further reduced relative to the angle $\beta_2$ in FIG. 2 so that free volume 30 has been reduced by the increased applied pressure. The sealing ring itself seats largely pressure-free on the low pressure side of the groove 34. The sealing ring 10 is not yet subject to fluid pressure in FIG. 3.

Figure 4:
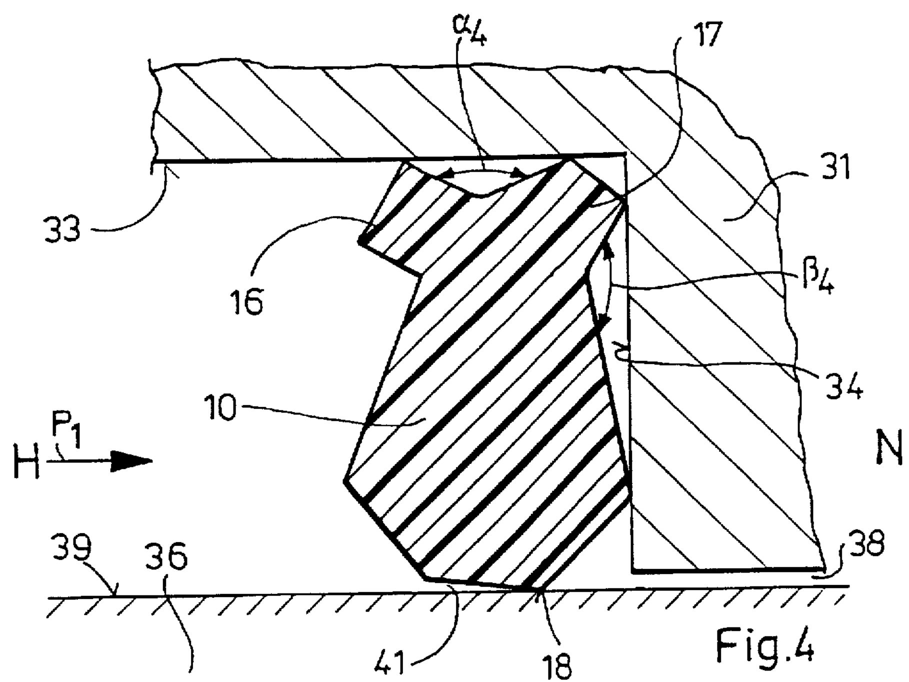
FIG. 4 shows a cross section of a sealing ring in accordance with the invention in a groove region between two machine elements under the application of pressure $P_1$.

FIG. 4 shows the sealing ring 10 in accordance with the invention under the application of pressure from the high pressure side H. The sealing ring 10 is loaded in the direction of the arrow with a pressure $P_1$. The sealing ring 10 is pressed more strongly onto the groove side 34 by fluid pressure $P_1$. Due to the shape of the profile of the sealing ring 10 in accordance with the invention, the sealing ring 10 is pivoted towards the low pressure side N and a first wedge-shaped gap 41 forms relative to the seating surface 39 which opens in the direction of the high pressure side H. The line of intersection 18 assumes the function of a dynamic sealing edge. The sealing ring 10 seats with line contact on the seating surface 39. The angle $\alpha_4$ has changed to a further extent with respect to the angle $\alpha_3$ since the position of the shoulders 16, 17 in the pressure region has changed due to the fluid pressure $P_1$. The angle $\beta_4$ has been qualitatively increased relative to $\beta_3$ since the sealing ring 10 is more strongly pressed onto the low pressure side of the groove 34 via the fluid pressure $P_1$. The fluid under pressure can penetrate into the first wedge-shaped gap 41 to thereby facilitate a good lubrication of the line of intersection 18.

Figure 5:
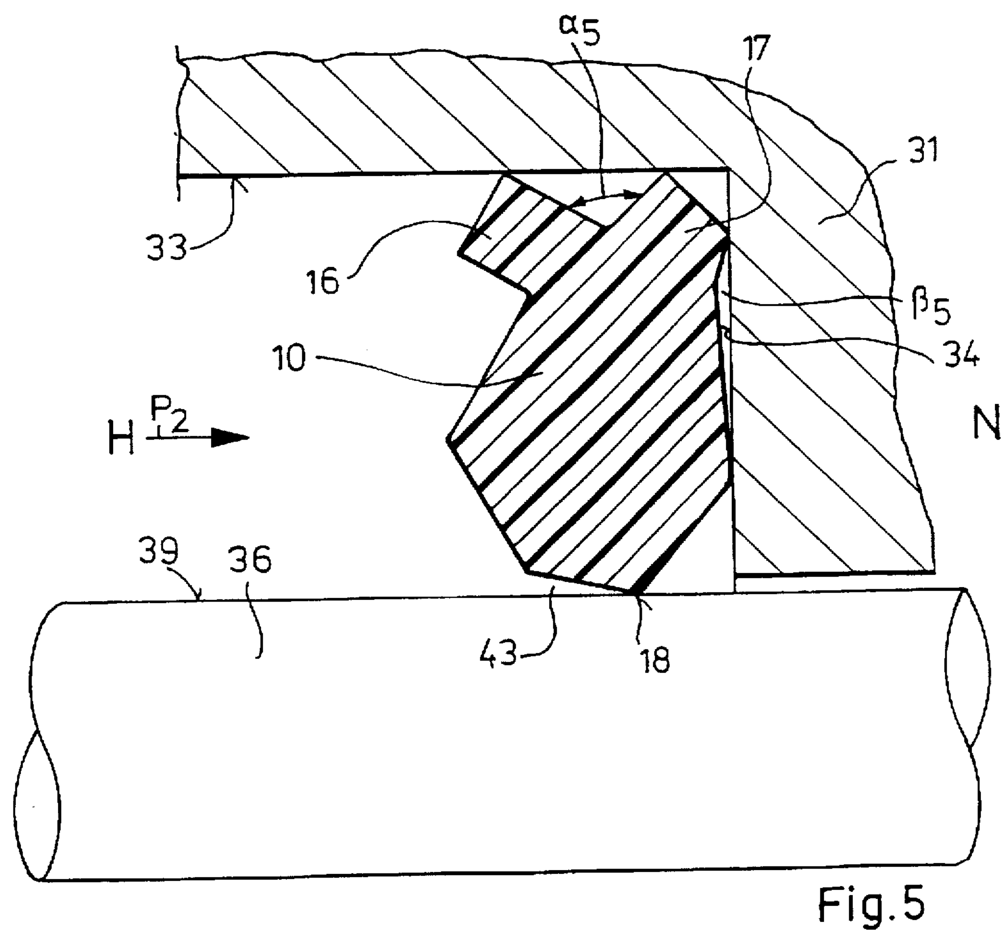
FIG. 5 shows a cross section of a sealing ring in accordance with the invention under the application of pressure $P_2$ which is larger than $P_1$.

FIG. 5 shows the sealing ring 10 in accordance with the invention under the application of pressure with a fluid pressure $P_2$ which is larger than the fluid pressure $P_1$ from FIG. 4. The sealing ring 10 is more strongly pressed onto the low pressure side of the groove 34 by means of the fluid pressure $P_2$ coming from the high pressure side H and the angle $\beta_5$ changes further relative to the angle $\beta_4$ of FIG. 4. Angle $\alpha_5$ has likewise qualitatively changed compared to angle $\alpha_4$ of FIG. 4. A second wedge-shaped gap 43 has established itself in the vicinity of the seating surface 39 which is larger than the first wedge-shaped gap 41 of FIG. 4. The shoulders 16, 17 allow the sealing ring 10 to distort strongly under the application of pressure. This distortion is reversible and is reduced when the pressure is decreased.

A configuration for sealing a gap 38 between two mutually concentric machine parts 31, 36 which move relative to each other exhibits a sealing ring 10 in the groove 32 which is mounted in spatially fixed fashion in machine element 31. The machine element 36 moves relative to the machine element 31. The sealing ring 10 in accordance with the invention is flexible in response to radial and axial forces acting on the sealing ring. The pressure dependent deformation of the sealing ring 10 is reversible, i.e. the sealing ring 10 automatically returns to its original shape for decreased fluid pressure on the high pressure side H.

We claim:

1. Sealing arrangement comprising:

a first machine part having a groove, the groove having a low pressure side and a high pressure side;

a second machine part having a smooth seating surface facing the groove, the first and second machine parts being concentric and moving relative to one another;

a sealing ring made from a rubber elastic material and sized for placement into the groove, said sealing ring having spreadable shoulders facing a bottom of the groove, the spreadable shoulders having lines of intersection with the bottom of the groove to form a closed ring-shaped volume with a probiased static seal at the bottom of the groove, the sealing ring having a cross section having a first recess which opens towards the how pressure side and a second recess which opens towards the high pressure side, the first and second recesses radially delimiting the shoulders and the first recess defining, together with the low pressure side, a free volume, and a sealing ring surface forms a dynamic seal with the seating surface, said cross section allowing axial flexing of said sealing ring under axial loading and enabling pressure resistance in a vicinity of the dynamic seal and the sealing ring being substantially changeable by pressure in a vicinity of the static seal, the dynamic seal being pressure relieved in proportion to an applied pressure, the sealing ring pivoting towards the low pressure side under the application of fluid pressure in the vicinity of the dynamic seal to reduce a size of the free volume and returning to an original shape and position when the fluid pressure is removed.

2. The sealing arrangement of claim 1, wherein the sealing ring comprises sealing ring sections defining an angle which changes under pressure.

3. The sealing arrangement of claim .1, wherein the sealing ring surface and the seating surface form a wedge shaped gap under the application of fluid pressure which opens towards the high pressure side and having a gap size which is pressure dependent.

4. The sealing arrangement of claim 1, wherein said cross section is formed from the sealing ring surface, from first and second conical surfaces bordering the sealing ring surface and spreading obliquely apart, from third and fourth conical surfaces travelling obliquely towards each other and bordering the first and second conical surfaces, and from first and second shoulders which spread obliquely apart and are adjacent to said third and fourth conical surfaces, the third and fourth conical surfaces defining, together with the shoulders, the recesses, the shoulders joining at a first angle facing the bottom of the groove and forming a second angle with the third and fourth conical surfaces.

5. The sealing arrangement of claim 4, wherein the sealing ring has conical surfaces directed towards the low pressure side which enclose the second angle.

6. The sealing arrangement of claim 1, wherein the sealing ring cross section is symmetric.

* * * * *